United States Patent
Ma et al.

(10) Patent No.: US 11,423,575 B1
(45) Date of Patent: Aug. 23, 2022

(54) INDIRECT DETERMINATION OF DYNAMIC DARK LEVEL OF AN IMAGING DEVICE

(71) Applicant: Tokyo Electron Limited, Tokyo (JP)

(72) Inventors: Feng Ma, Fremont, CA (US); Weiwen Xu, Fremont, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 17/335,781

(22) Filed: Jun. 1, 2021

(51) Int. Cl.
  *G06T 7/80* (2017.01)
  *H04N 17/00* (2006.01)
  *H04N 5/369* (2011.01)

(52) U.S. Cl.
  CPC ........... *G06T 7/80* (2017.01); *H04N 5/36963* (2018.08); *H04N 17/002* (2013.01)

(58) Field of Classification Search
  CPC ...................................................... G06T 7/80
  See application file for complete search history.

(56) References Cited

U.S. PATENT DOCUMENTS

| | | | | |
|---|---|---|---|---|
| 7,196,721 B2* | 3/2007 | Uchiyama | ................. | G06T 7/80 348/187 |
| 7,821,701 B2* | 10/2010 | Lenssen | ............... | G09G 3/3446 359/296 |
| 10,630,919 B2* | 4/2020 | Huang | ....................... | G06T 7/80 |
| 10,838,049 B1* | 11/2020 | Schwiesow | ............. | G01S 17/89 |
| 10,911,680 B2* | 2/2021 | Kerr | ....................... | G06T 7/0002 |
| 10,916,036 B2* | 2/2021 | Nikkanen | ................. | G06T 7/70 |
| 2010/0283874 A1* | 11/2010 | Kinrot | ..................... | G06T 5/003 348/241 |
| 2013/0322753 A1* | 12/2013 | Lim | .......................... | G06T 5/50 382/167 |

* cited by examiner

*Primary Examiner* — Brian P Yenke
(74) *Attorney, Agent, or Firm* — Oblon, McClelland, Maier & Neustadt, L.L.P.

(57) ABSTRACT

A method of characterizing an imaging device includes calibrating the imaging device by collecting readings for regular pixels and at least one sealed pixel of the imaging device over one or more periods of time for a sequence of integration time (T) and a plurality of number of lines (NOL) when no light enters the imaging device, obtaining a dark level (DL) by averaging the readings for the regular pixels over the respective period of time and the number of the regular pixels, and obtaining P by averaging the readings of the at least one sealed pixel over the respective period of time and the number of the at least one sealed pixel. A relation between DL and P is determined for each T and NOL using an equation: DL=A*P+Offset. A current value of DL is determined by using a current value of P and the equation.

20 Claims, 6 Drawing Sheets

INDIRECT DETERMINATION OF DYNAMIC DARK LEVEL OF AN IMAGING DEVICE

FIELD OF THE INVENTION

This disclosure relates generally to characterizing an imaging device and, more particularly, to determining a dark level of an imaging device.

BACKGROUND

In applications involving an imaging device, the dark level of the imaging device is an important piece of information. The dark level is one of the characterizations of the imaging device. It can be calculated by averaging the outputs from the imaging device over a period of time and a number of pixels of interest when no light enters the imaging device. The imaging device can include any suitable imaging sensor such as a charge-coupled device (CCD) sensor and a complementary metal-oxide-semiconductor (CMOS) sensor. The imaging device can be one-dimensional (1D), two-dimensional (2D) or three-dimensional (3D).

SUMMARY

The present disclosure relates to a method of characterizing an imaging device.

An aspect (1) includes a method of characterizing an imaging device. The method includes calibrating the imaging device by collecting readings for regular pixels and at least one sealed pixel of the imaging device over one or more periods of time for a sequence of integration time (T) and a plurality of number of lines (NOL) when no light enters the imaging device, obtaining a dark level (DL) of the imaging device by averaging the readings for the regular pixels over the respective period of time and the number of the regular pixels, and obtaining P by averaging the readings of the at least one sealed pixel over the respective period of time and the number of the at least one sealed pixel. A relation between DL and P is determined for each T and NOL using a first equation: $DL = A*P + Offset$. A current value of DL is determined by using a current value of P and using the first equation.

An aspect (2) includes the method of aspect (1), further including determining a relation between P and T using a second equation for each NOL.

An aspect (3) includes the method of aspect (2), wherein DEVICE NOL is a set of consecutive positive integers beginning with 1 and ending with N. The method further includes dividing DEVICE NOL into subsets, each subset having a representative NOL chosen from the plurality of NOL.

An aspect (4) includes the method of aspect (3), wherein determining the current value of DL includes identifying a current NOL and identifying the corresponding representative NOL of the particular subset which the current NOL is an element of. The corresponding second equation is identified that has been determined for the corresponding representative NOL.

An aspect (5) includes the method of aspect (4), further including determining the current value of P by using the corresponding second equation and the current value of T.

An aspect (6) includes the method of aspect (5), further including obtaining the current value of DL by plugging the current value of P into the corresponding first equation.

An aspect (7) includes the method of aspect (3), wherein an error defined by a third equation is within a pre-determined threshold for any real NOL that is a positive integer within a particular subset of DEVICE NOL. The third equation is $$\text{Error} = \frac{\text{Cal. DL(Rep. NOL)} - \text{Meas. DL(Real NOL)}}{\text{Meas. DL(Real NOL)}} \times 100\%.$$

Cal. DL(Rep. NOL) is a calculated DL by using the corresponding representative NOL of the particular subset in lieu of the real NOL and using the first and second equations for the corresponding representative NOL. Meas. DL(Real NOL) is obtained by collecting readings for the regular pixels for the real NOL and a respective T when no light enters the imaging device and averaging the readings for the regular pixels over the respective period of time and the number of the regular pixels.

An aspect (8) includes the method of aspect (3), wherein N=256 so that DEVICE NOL={1, 2, 3, ..., 256}.

An aspect (9) includes the method of aspect (8), wherein DEVICE NOL is divided into three subsets, {1, 2, 3, ..., 75}, {76, 77, 78, ..., 150}, and {151, 152, 153, ..., 256}. 40, 110, and 220 are the representative NOL for {1, 2, 3, ..., 75}, {76, 77, 78, ..., 150}, and {151, 152, 153, ..., 256}, respectively.

An aspect (10) includes the method of aspect (2), wherein the second equation is $P = K*Ln(T) + B$.

An aspect (11) includes the method of aspect (10), wherein current readings of the at least one sealed pixel are unavailable so that the current value of P is derived by using the second equation and the current value of T.

An aspect (12) includes the method of aspect (11), wherein K is determined by using the readings collected while calibrating the imaging device. B is determined by using K and a previous P that is still valid.

An aspect (13) includes the method of aspect (1), wherein current readings of the at least one sealed pixel are available so that the current value of P is obtained by averaging the current readings of the at least one sealed pixel over the respective period of time and the number of the at least one sealed pixel and then used directly in the first equation.

An aspect (14) includes the method of aspect (1), wherein the current value of T is identical to a particular T in the sequence of T so that the respective first equation has already been determined for the current value of T.

An aspect (15) includes the method of aspect (1), wherein the current value of T is different from all T in the sequence of T.

An aspect (16) includes the method of aspect (15), further including identifying T1 in the sequence of T. T1 is the largest T that is smaller than the current value of T. T2 is identified in the sequence of T. T2 is the smallest T that is larger than the current value of T. A value of Offset(T) is interpolated using Offset(T1) and Offset(T2). Offset(T), Offset(T1), and Offset(T2) are values of Offset in the first equation for T, T1, and T2, respectively.

An aspect (17) includes the method of aspect (16), wherein interpolating the value of Offset(T) includes executing a linear interpolation using a fourth equation:

$$\text{Offset}(T) = \text{Offset}(T1) + \frac{\text{Offset}(T2) - \text{Offset}(T1)}{T2 - T1} \times (T - T1).$$

An aspect (18) includes the method of aspect (1), wherein A is pre-set as 1.

An aspect (19) includes the method of aspect (1), wherein P is a weighted average of the readings of the at least one sealed pixel.

An aspect (20) includes the method of aspect (1), prior to calibrating the imaging device, the method further including having the imaging device reach a stable status.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION

Figure 1:
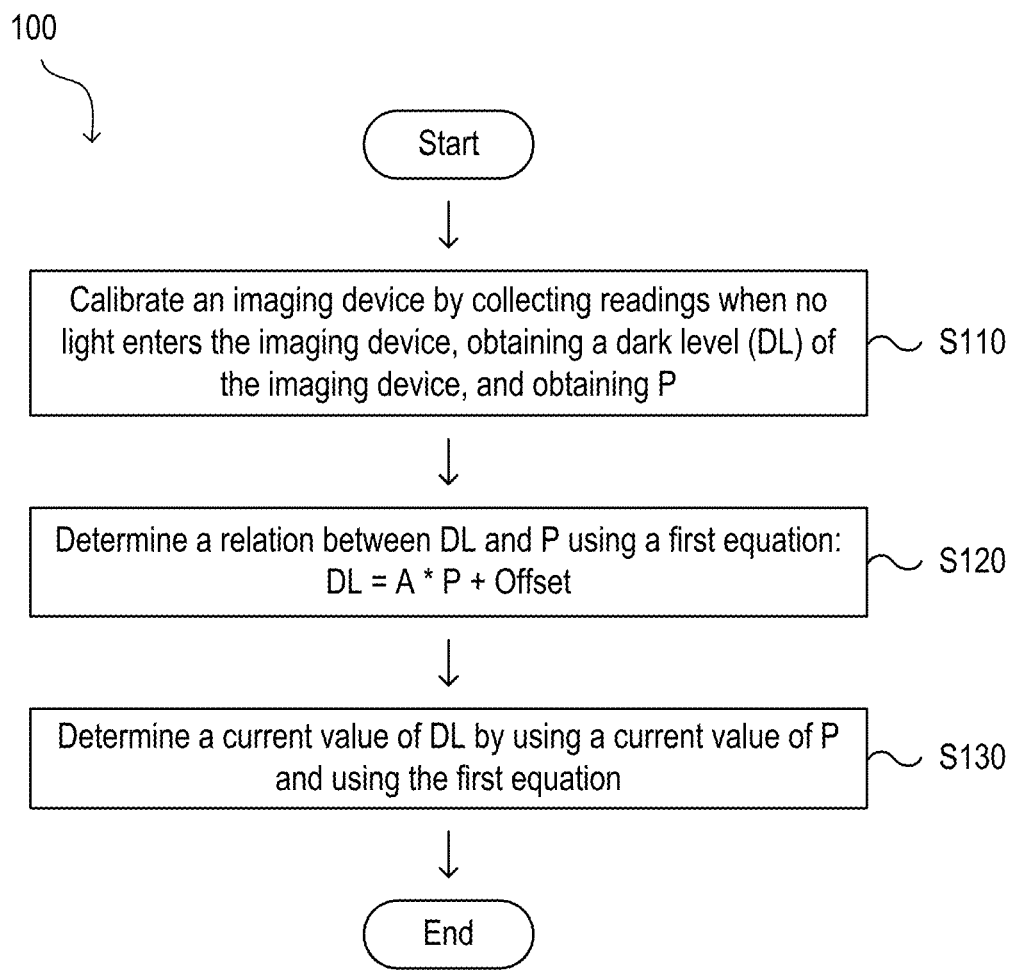
FIG. 1 shows a flowchart of an exemplary process for determining a dark level (DL) of an imaging device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Normally, one directly measures and calculates the dark level. However, directly measuring the dark level sometimes is not feasible due to various limitations, or the dark level is changing with time due to system working condition and environment changes. Accordingly, the dark level determined in advance is no longer valid. In such scenarios, a technique that can update the dark level indirectly will be useful.

Figure 2:
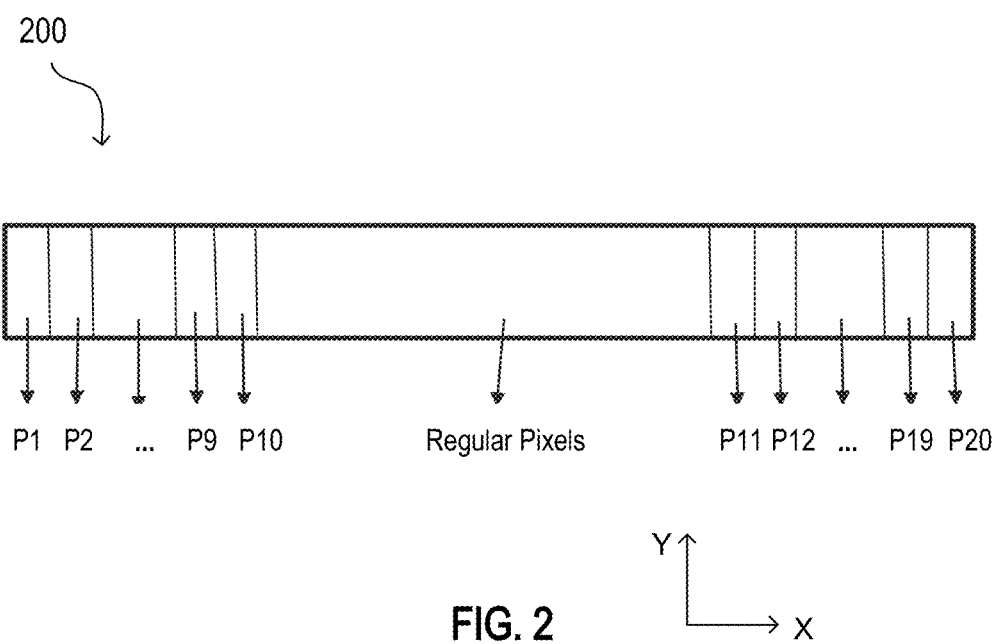
FIG. 2 shows a schematic of an imaging device, in accordance with some embodiments of the present disclosure.

FIG. 2 shows a schematic of an imaging device 200, in accordance with some embodiments of the present disclosure. The imaging device 200 can include any suitable imaging sensor such as a CCD sensor and a CMOS sensor. The imaging device 200 can be 1D, 2D or 3D. In the example of FIG. 2, the imaging device 200 is a 2D CCD sensor which includes pixels and lines (not shown) that are perpendicular to the pixels.

A 2D CCD sensor normally uses a number of regular pixels (for instance, one thousand and twenty-four regular pixels or two thousand and forty-eight regular pixels). Before or after these regular pixels, there are some pixels which are not actively used. In a non-limiting example, the imaging device 200 has two thousand and forty-eight regular pixels. Before and after these two thousand and forty-eight regular pixels, there are ten unused pixels respectively (totally twenty), denoted as P1, P2 . . . P9, P10, and P11, P12 . . . P19, and P20, which are normally unused. Among P1-P20, some pixels are well sealed without light penetrating and are thus referred to as sealed pixels. For example, in our built sensors (e.g., US patents U.S. Pat. Nos. 8,107,073B2 and 7,924,422B2), outputs from P3, P4, P19, P20 when no light enters the sensors are very close to corresponding outputs when light from sources ranging from IR to UV enters the sensors. As a result, P3, P4, P19, P20 are considered sealed pixels. Note that the imaging device 200 may have any number of regular pixels and any number of unused pixels before and/or after the regular pixels to meet specific design requirements.

In some embodiments, the imaging device 200 is a 1D CCD sensor. Accordingly, pixel count in the Y direction is lost; pixels are only counted in the X direction. Note that while a 2D CCD sensor is used as a primary example for FIGS. 2, 3A-3B, 4, 5A-5C and 6, descriptions for FIGS. 2, 3A-3B, 4, 5A-5C and 6 will also be applicable to a 1D CCD sensor, a 3D CCD sensor, a CMOS sensor and the like.

Figure 3A:
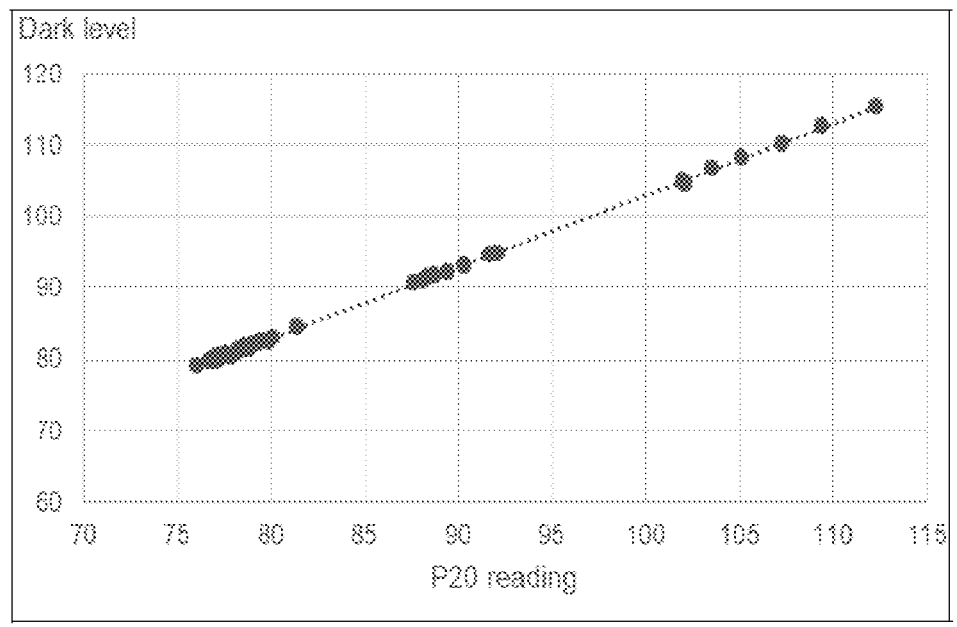
FIGS. 3A and 3B show correlations between DL and readings of a sealed pixel for different integration time (T), in accordance with some embodiments of the present disclosure.
Figure 3B:
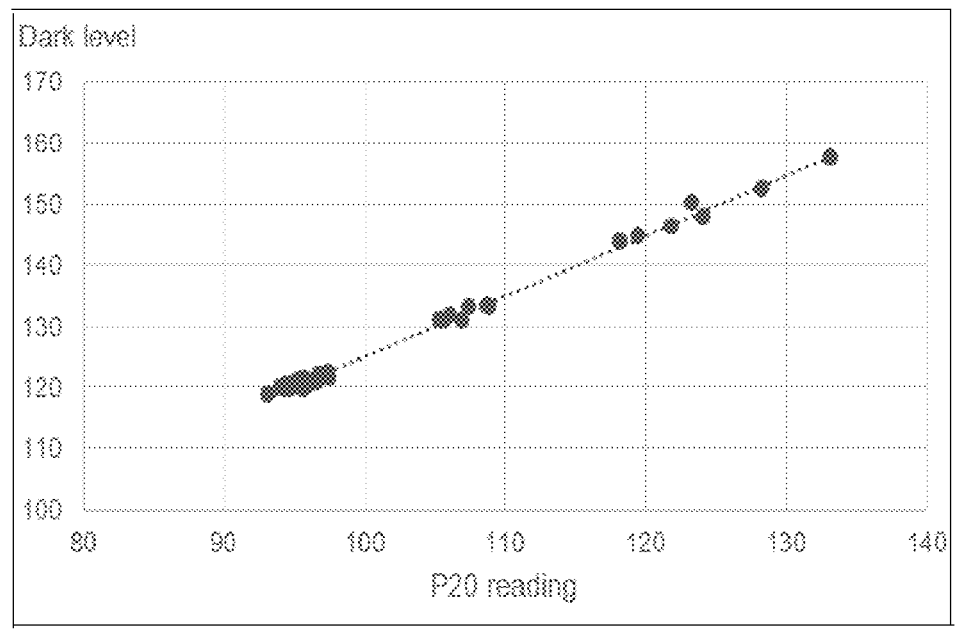

FIGS. 3A and 3B show correlations between the dark level (DL) and readings of a sealed pixel (e.g., P20) for different integration time (T), in accordance with some embodiments of the present disclosure. DL is obtained by averaging readings for the regular pixels when no light enters the imaging device over a respective period of time over which the readings are collected and over the overall number of the regular pixels.

To study the correlations between DL and readings of P20 within our built sensors, the readings from those sealed pixels and the regular pixels without light entering the sensors were recorded for a long period of time. The readings showed how much light passed through a corresponding pixel. For some of the sensors, data acquisition was performed within hours, others within days or weeks with some power cycling if needed. The data was acquired under different settings of the sensors, i.e., the integration time (T) and the number of lines (NOL). To remove randomness and/or fluctuations, the readings for each sealed pixel were averaged over a given period of time, for example ten seconds. The readings from the regular pixels (e.g., the two thousand and forty-eight regular pixels) were also averaged over the given period of time and averaged over the overall number of the regular pixels (e.g., two thousand and forty-eight), which was the dark level of the sensor.

Analyzing these averaged results has revealed strong correlations between the dark level and the readings from the sealed pixels. For example, FIGS. 3A and 3B show that DL has a good linear correlation with readings from P20. FIG. 3A uses data acquired for T=10 ms, NOL=124, and FIG. 3B uses data acquired for T=100 ms, NOL=124. A first equation can be used to express the relation between the dark level, denoted as y, and the readings from P20, denoted as x. The first equation is:

$$y = A^* x + \text{Offset}_{P20} \qquad (1)$$

For a specific type of imaging devices, slope "A" can be approximated by a constant. For example, in our built sensors, A=1 is used. $\text{Offset}_{P20}$ presents some dependence on the sensor's parameter settings: T and NOL. In some examples, $\text{Offset}_{P20}$ depends on T more than NOL. This dependence can be figured out and stored in advance in a calibration process of the sensor. In some embodiments, A may be approximated by a different constant.

In alternative embodiments, A is not approximated by any constant so both A and $\text{Offset}_{P20}$ will be determined by using the averaged results acquired. For example, y=1.0033*x+2.5922 is found to be a good linear fit for the data in FIG. 3A, with $R^2$=0.9996. Also, y=0.9891*x+26.0830 is found to be a good linear fit for the data in FIG. 3B, with $R^2$=0.9962. Accordingly, values for A and $\text{Offset}_{P20}$ will be stored for future use. Moreover, these fitting results also show why A can be approximated by a constant such as 1 in our built sensors.

While not shown, more data acquired from several sensors under various parameter settings of T and NOL has revealed similar relations between DL and the readings from a given sealed pixel. For example, DL also shows a good linear correlation with readings for P3 or P4. As a result, the first equation can be used to express the relation between DL and the readings for P3 or P4. Moreover, DL and averaged readings for a plurality of sealed pixels also show a good linear correlation. For example, the first equation can be used to express the relation between DL and averaged readings for P3, P4, and P20. While P20 is used as a main example in FIGS. 3A, 3B, 4, 5A, 5B, 5C, and 6, it should be understood that readings for any sealed pixel or averaged readings for a plurality of sealed pixels will reveal similar or identical results.

In applications, if readings for P20 at current sensor's settings are available, a current value of DL can be calculated immediately by the first equation. However, due to various limitations, the readings for P20 for current T and NOL may not always be available, under which circumstance, the only available valid readings for P20 are from previous T and NOL. A method is thus required to derive the readings for P20 for current T and NOL based on the reading obtained for previous T and NOL.

Figure 4:
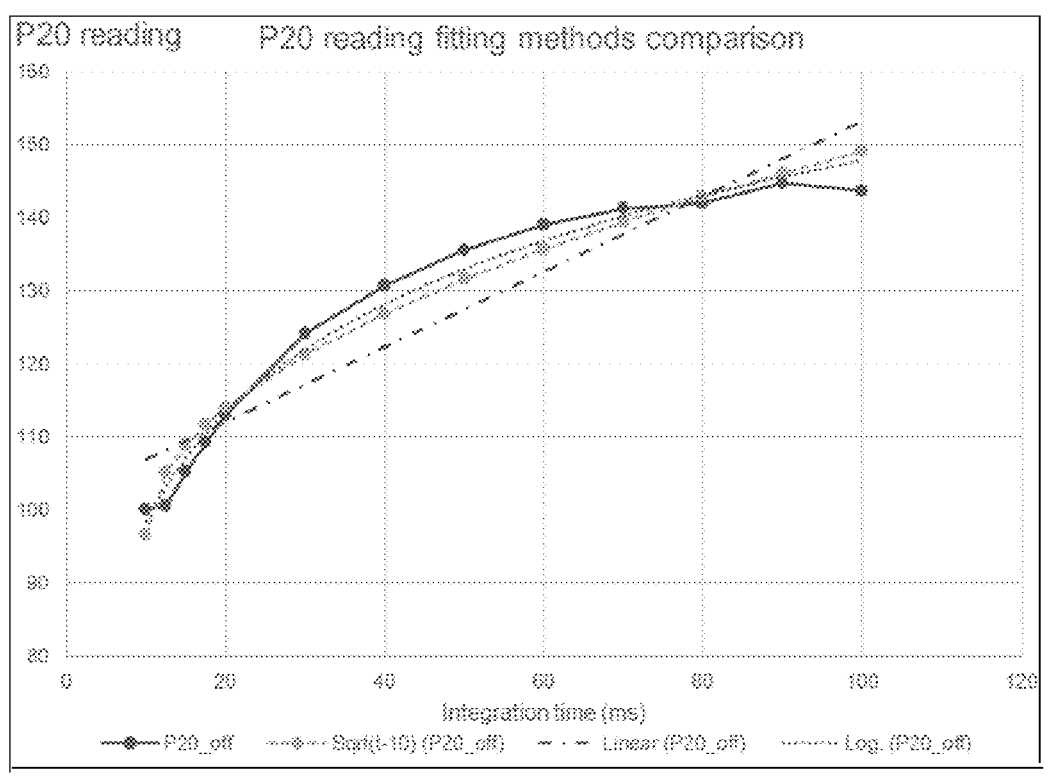
FIG. 4 shows a comparison between fitting methods for readings of a sealed pixel and T, in accordance with some embodiments of the present disclosure.

Similar to $\text{Offset}_{P20}$, readings for P20 also depend on T and NOL. FIG. 4 demonstrates how the readings for P20 change as a function of T for a given NOL (e.g., NOL=124) and compares different fitting methods to approximate the relation between P20 readings and T. As shown, P20_off means that light is off (that is, no light enters the imaging device). Sqrt(t-10) (P20_off), Linear (P20_off), and Log. (P20_off) means square root fitting, linear fitting, and logarithmic fitting, respectively, of averaged readings for P20 when no light enters the imaging device. Specifically, Sqrt (t-10) (P20_off), Linear (P20_off), and Log. (P20_off) use equations (2a), (2b), and (2c), respectively, wherein the readings from P20 is denoted as y and T is denoted as x:

$$y = K^* \text{Sqrt}(x-10) + B \qquad (2a)$$

$$y = K^* x + B \qquad (2b)$$

$$y = K^* Ln(x) + B \qquad (2c)$$

Among the three fitting methods compared in FIG. 4, the logarithmic fitting, Log. (P20_off) provides the best accuracy. Hence, Equation (2c) will be used as a second equation and as a main example for descriptions in FIGS. 5A-5C and 6. Note that fitting results generated by Equation (2c) meet accuracy requirements in our experimental settings. However, given a different accuracy requirement or a different experimental setting, other fitting methods may provide acceptable accuracy; the logarithmic fitting by Equation (2c) may even fail to meet a corresponding accuracy requirement. Consequently, the fitting method and the second equation may differ, depending on specific imaging devices and accuracy requirements.

Figure 5A:
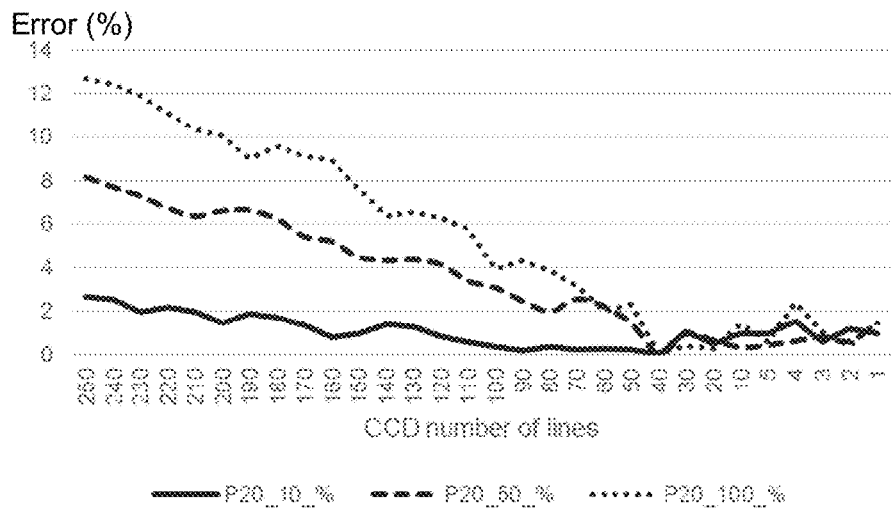
FIGS. 5A, 5B, and 5C show calculation errors between calculated DL and measured DL when the calculation is based on a single number of lines (NOL) for various NOL, in accordance with some embodiments of the present disclosure.
Figure 5B:
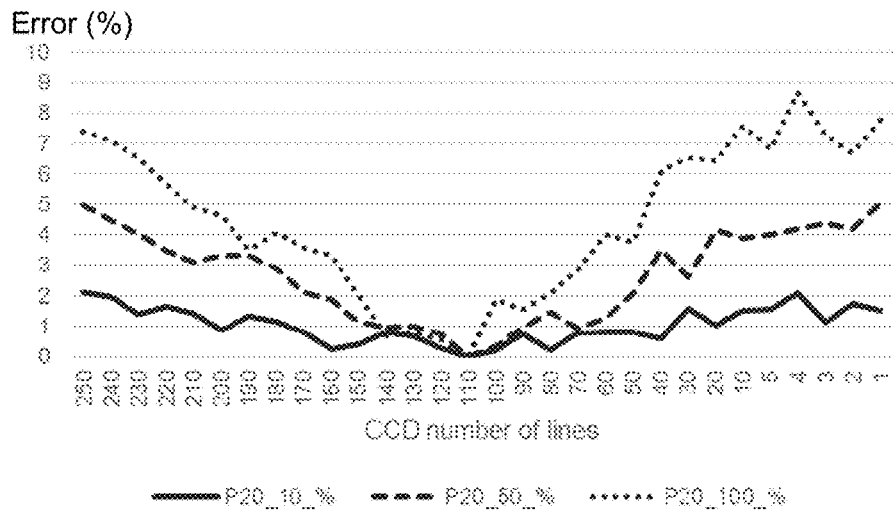
Figure 5C:
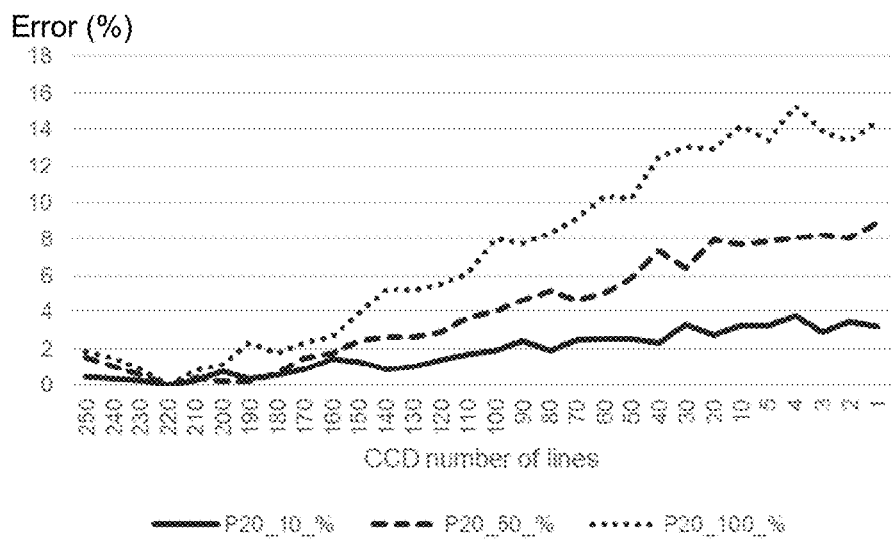

The above descriptions have mostly considered the effects of the T on P20 readings and $\text{Offset}_{P20}$ for a given NOL. But NOL also affects P20 readings and $\text{Offset}_{P20}$, and therefore calculated DL. Further study found that the calculated DL is not as sensitive to NOL as to T. FIGS. 5A, 5B, and 5C show calculation errors between the calculated DL and measured DL when calculation is based on a single NOL (e.g., a representative NOL) for various NOL, in accordance with some embodiments of the present disclosure. In a non-limiting example, the imaging device investigated in FIGS. 5A, 5B and 5C is a 2D CCD sensor. The calculation errors are defined by a third equation:

$$\text{Error} = \frac{\text{Cal. DL(Rep. NOL)} - \text{Meas. DL(Real NOL)}}{\text{Meas. DL(Real NOL)}} \times 100\%. \qquad (3)$$

Herein, Cal. DL(Rep. NOL) is a calculated DL by using a representative NOL in lieu of a real NOL and using the first and second equations for the representative NOL. Meas. DL(Real NOL) is obtained by collecting readings for the regular pixels for the real NOL and a respective T when no light enters the imaging device and averaging the readings for the regular pixels over the respective period of time and the number of the regular pixels. In other words, Cal. DL(Rep. NOL) is a calculated, approximated DL while Meas. DL(Real NOL) is a measured, real DL.

Specifically, in FIG. 5A, NOL=40 is used as the representative NOL. The third equation for FIG. 5A is thus:

$$\text{Error} = \frac{\text{Cal. DL}(40) - \text{Meas. DL}(\text{Real NOL})}{\text{Meas. DL}(\text{Real NOL})} \times 100\%. \quad (3a)$$

Three curves are plotted for T=10 ms, T=50 ms, and T=100 ms, respectively. P20_10_%, P20_50_%, and P20_100_% represent Errors in percentage based on P20 readings for T=10 ms, T=50 ms, and T=100 ms, respectively. For example, Error is about 2% for CCD number of lines=80 for P20_50_%, which means that $$\text{Error} = \frac{\text{Cal. DL}(40) - \text{Meas. DL}(40)}{\text{Meas. DL}(\text{Real NOL})} \times 100\%.$$

is about 2% for T=50 ms. Further, Error is 0% for CCD number of lines=40 for P20_10_%, P20_50_%, and P20_100_% because the representative NOL is equal to 40.

The plots in FIGS. 5B and 5C are obtained similarly, except that NOL=110 and 220 are used as the representative NOL for FIGS. 5B and 5C, respectively. The descriptions will therefore be omitted here for simplicity.

Still referring to FIGS. 5A-5C, Errors associated with a representative NOL for a real NOL that is close to the representative NOL are within a certain threshold. For example, for the representative NOL=40 in FIG. 5A, Errors are smaller than 5% for any real NOL that is in the range from 1 to 100. For the representative NOL=110 in FIG. 5B, Errors are smaller than 4% for any real NOL that is in the range from 70 to 170. Therefore, for simplicity, without losing much accuracy three representative NOL can be used to calibrate the imaging device in a manufacturing process. The representative NOL=40, 110, and 220 will cover the range of 1-75, 75-150, and 150-256, respectively (only needed for the CCD type of 256 lines in the example of FIG. 5A-5C).

In some embodiments, a different group of representative NOL can be chosen without losing much accuracy. For example, representative NOL=39, 112, and 220 may be used to cover the range of 1-75, 75-150, and 150-256, respectively. In some embodiments, the representative NOL=40, 100, 220 are still used but cover different ranges. For example, the representative NOL=40, 100, 220 may cover the range of 1-72, 73-151, and 152-256, respectively. In some embodiments, a different accuracy is required. For example, if Errors defined by the third equation are required to be smaller than 2%, more than three representative NOL may be needed to cover the whole range of 1-256. In some embodiments, more than or less than 256 lines are used, or imaging devices are configured differently so that Error plots may be inherently different. Ergo, a different group of representative NOL and/or a different number of representative NOL may be used.

According to principles described above, an imaging device needs to be calibrated in order to calculate DL dynamically in field applications. FIG. 1 shows a flowchart of a process 100 for determining DL of an imaging device, in accordance with some embodiments of the present disclosure.

The process 100 starts with Step S110 where the imaging device is calibrated. Specifically, readings for regular pixels and at least one sealed pixel of the imaging device are collected over one or more periods of time for a sequence of T and a plurality of NOL when no light enters the imaging device. DL of the imaging device is obtained by averaging the readings for the regular pixels over the respective period of time and the number of the regular pixels. P is obtained by averaging the readings of the at least one sealed pixel over the respective period of time and the number of the at least one sealed pixel. In some embodiments, P is a weighted average calculated by assigning weight to the at least one sealed pixel.

At Step S120, a relation between DL and P is determined for each T and NOL using a first equation: DL=A*P+Offset. In some embodiments, a relation between P and T is determined using a second equation, P=K*Ln(T)+B for each NOL. In some embodiments, DEVICE NOL is a set of consecutive positive integers beginning with 1 and ending with N. In one embodiment, N is the overall number of lines the imaging device has. DEVICE NOL is divided into subsets, with each subset having a representative NOL chosen from the plurality of NOL. Consequently, each NOL in a subset can be approximated by the representative NOL when P is calculated by using the second equation.

The process 100 then proceeds to Step S130 where a current value of DL is determined by using a current value of P and using the first equation. In some embodiments, determining the current value of DL includes identifying the corresponding representative NOL of the particular subset which a current NOL is an element of, and identifying the corresponding second equation that has been determined for the corresponding representative NOL. As a result, the current value of P can be determined by using the corresponding second equation and the current value of T. The current value of DL is then obtained by plugging the current value of P into the corresponding first equation.

In some embodiments, the following steps are used to calibrate the imaging device. Firstly, after the imaging device runs into a stable status, collect readings for the regular pixels and P20 over one or more periods of time for a sequence of T and several NOL when no light enters the imaging device. In our built sensors, data are collected for T=10 ms, 12.5 ms, 15 ms, 17.5 ms, 20 ms, 30 ms, 40 ms, 50 ms, 60 ms, 70 ms, 80 ms, 90 ms, 100 ms and NOL=40, 110, 220, respectively. Real dark levels for these settings are obtained by averaging the readings for the regular pixels over a respective period of time and over the number of the regular pixels. Secondly, based on the data obtained, Offset$_{P20}$ in the first equation for a particular setting can be derived, and K for the particular setting can also be obtained by a logarithmic-linear fitting using the second equation. Offset$_{P20}$ and K are then stored for future use. In other words, the first and second equations for each T and NOL are determined and stored as part of the calibration process.

After the imaging device is calibrated, the real dark levels can be determined dynamically. In field applications, the first equation is used to calculate DL based on a current P20 reading or a valid previous P20 reading. If a current value of T is one of the values used in the calibration process, the corresponding Offset$_{P20}$ can be found in calibration and directly used. Otherwise, an interpolation is used to obtain a current value of Offset$_{P20}$ for the current value of T. For example, a linear interpolation can be executed using a fourth equation:

$$\text{Offset}(T) = \text{Offset}(T1) + \frac{\text{Offset}(T2) - \text{Offset}(T1)}{T2 - T1} \times (T - T1), \quad (4)$$

wherein T1, being in the sequence of T, is the largest T that is smaller than the current value of T. T2, being in the sequence of T, is the smallest T that is larger than the current value of T. Offset(T), Offset(T1), and Offset(T2) are values of Offset in the first equation for T, T1, and T2, respectively.

If the current P20 reading is available, the current P20 reading will be used in the first equation directly. If the current P20 reading is unavailable, the current P20 reading is derived by using the second equation and the current value of T. In some embodiments, only K is calibrated, and B is not for the second equation. Change in the P20 current reading is considered small enough compared with a previous P20 reading. B is calculated using the previous P20 reading and a corresponding previous value of T. Then, the current P20 reading is calculated using the second equation and the current value of T, with K and B known.

Figure 6:
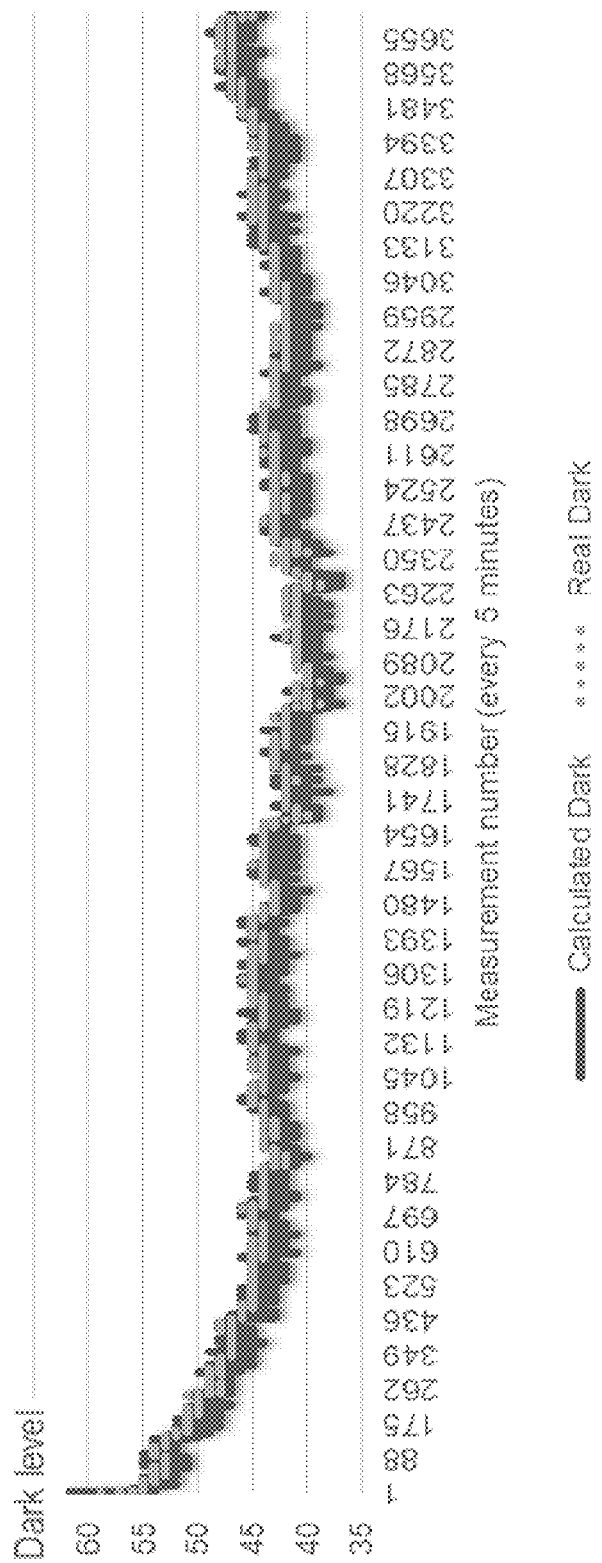
FIG. 6 shows a comparison between calculated DL and measured DL for a long time, in accordance with some embodiments of the present disclosure.

Using the principles and the process 100 described above, an imaging device was calibrated. In a non-limiting example, FIG. 6 shows a comparison between calculated DL and measured DL for a long time, in accordance with some embodiments of the present disclosure. As shown, DL is plotted as a function of measurement number. Measurement was taken every five minutes. Therefore, the DL for measurement number=1 is the DL for the imaging device at the fifth minute (1*5=5) after the experiment started. "Calculated Dark" is obtained by using the principles and the process 100 described above while "Real Dark" is obtained by averaging readings for the regular pixels over a respective period of time and the number of the regular pixels when no light enters the imaging device. FIG. 6 demonstrates a good agreement between the calculated DL and the real DL (i.e., the measured DL).

Techniques herein indirectly determine the dark level of an imaging device dynamically. The basic ideas and the principles are introduced. The correlations between the dark level and the readings from some sealed pixels are utilized to track the dark level of the imaging device dynamically and indirectly. The effects of an imaging device's parameter settings such as T and NOL on this technique are presented. The formulations used in the technique are given. Then, this disclosure describes the procedures to calibrate the imaging device and calculate the dark level dynamically according to the imaging device's current settings and current available valid readings from one or more sealed pixels. The results from one example of testing demonstrate the effectiveness and feasibility of this technique.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A method of characterizing an imaging device, the method comprising:
    calibrating the imaging device by collecting readings for regular pixels and at least one sealed pixel of the imaging device over one or more periods of time for a sequence of integration time (T) and a plurality of number of lines (NOL) when no light enters the imaging device, obtaining a dark level (DL) of the imaging device by averaging the readings for the regular pixels over the respective period of time and the number of the regular pixels, and obtaining P by averaging the readings of the at least one sealed pixel over the respective period of time and the number of the at least one sealed pixel, wherein P is an averaged reading for the at least one sealed pixel;
    determining a relation between DL and P for each T and NOL using a first equation: DL=A*P+Offset, wherein A is a slope of the first equation, and Offset is an intercept of the first equation; and
    determining a current value of DL by using a current value of P and using the first equation.

2. The method of claim 1, further comprising determining a relation between P and T using a second equation for each NOL.

3. The method of claim 2, wherein DEVICE NOL is a set of consecutive positive integers beginning with 1 and ending with N, the method further comprising dividing DEVICE NOL into subsets, each subset having a representative NOL chosen from the plurality of NOL.

4. The method of claim 3, wherein determining the current value of DL comprises:
    identifying a current NOL;
    identifying the corresponding representative NOL of the particular subset which the current NOL is an element of; and
    identifying the corresponding second equation that has been determined for the corresponding representative NOL.

5. The method of claim 4, further comprising determining the current value of P by using the corresponding second equation and the current value of T.

6. The method of claim 5, further comprising obtaining the current value of DL by plugging the current value of P into the corresponding first equation.

7. The method of claim 3, wherein an error defined by a third equation is within a pre-determined threshold for any real NOL that is a positive integer within a particular subset of DEVICE NOL, the third equation being:

$$\text{Error} = \frac{Cal.\ DL(Rep.\ NOL) - Meas.\ DL(Real\ NOL)}{Meas.\ DL(Real\ NOL)} \times 100\%,$$

wherein:
- Cal. DL(Rep. NOL) is a calculated DL by using the corresponding representative NOL of the particular subset in lieu of the real NOL and using the first and second equations for the corresponding representative NOL, and
- Meas. DL(Real NOL) is obtained by collecting readings for the regular pixels for the real NOL and a respective T when no light enters the imaging device and averaging the readings for the regular pixels over the respective period of time and the number of the regular pixels.

8. The method of claim 3, wherein N=256 so that DEVICE NOL={1, 2, 3, . . . , 256}.

9. The method of claim 8, wherein:
- DEVICE NOL is divided into three subsets, {1, 2, 3, . . . , 75}, {76, 77, 78, . . . , 150}, and {151, 152, 153, . . . , 256}, and
- 40, 110, and 220 are the representative NOL for {1, 2, 3, . . . , 75}, {76, 77, 78, . . . , 150}, and {151, 152, 153, . . . , 256}, respectively.

10. The method of claim 2, wherein the second equation is P=K*Ln(T)+B, wherein:
- Ln(T) is a natural logarithm of T,
- K is a constant of the second equation and represents a rate of change of P with respect to Ln(T), and
- B is an intercept of the second equation.

11. The method of claim 10, wherein current readings of the at least one sealed pixel are unavailable so that the current value of P is derived by using the second equation and the current value of T.

12. The method of claim 11, wherein:
- K is determined by using the readings collected while calibrating the imaging device, and
- B is determined by using K and a previous P that is still valid.

13. The method of claim 1, wherein current readings of the at least one sealed pixel are available so that the current value of P is obtained by averaging the current readings of the at least one sealed pixel over the respective period of time and the number of the at least one sealed pixel and then used directly in the first equation.

14. The method of claim 1, wherein the current value of T is identical to a particular T in the sequence of T so that the respective first equation has already been determined for the current value of T.

15. The method of claim 1, wherein the current value of T is different from all T in the sequence of T.

16. The method of claim 15, further comprising:
- identifying T1 in the sequence of T, T1 being the largest T that is smaller than the current value of T;
- identifying T2 in the sequence of T, T2 being the smallest T that is larger than the current value of T; and
- interpolating a value of Offset(T) using Offset(T1) and Offset(T2), wherein Offset(T), Offset(T1), and Offset(T2) are values of Offset in the first equation for T, T1, and T2, respectively.

17. The method of claim 16, wherein interpolating the value of Offset(T) comprises executing a linear interpolation using a fourth equation:

$$\text{Offset}(T) = \text{Offset}(T1) + \frac{\text{Offset}(T2) - \text{Offset}(T1)}{T2 - T1} \times (T - T1).$$

18. The method of claim 1, wherein A is pre-set as 1.

19. The method of claim 1, wherein P is a weighted average of the readings of the at least one sealed pixel.

20. The method of claim 1, prior to calibrating the imaging device, the method further comprising having the imaging device reach a stable status.

* * * * *